United States Patent
Potts et al.

(10) Patent No.: US 9,797,808 B2
(45) Date of Patent: Oct. 24, 2017

(54) DIAGNOSIS OF GEAR CONDITION BY COMPARING DATA FROM COUPLED GEARS

(71) Applicant: RMCI, Inc., Huntsville, AL (US)

(72) Inventors: Stephen Cary Potts, Huntsville, AL (US); Josiah David Thomas, Athens, AL (US)

(73) Assignee: RMCI, inc., Huntsville, AL (US)

( * ) Notice: Subject to any disclaimer, the term of this patent is extended or adjusted under 35 U.S.C. 154(b) by 0 days.

(21) Appl. No.: 14/714,218

(22) Filed: May 15, 2015

(65) Prior Publication Data

US 2015/0330867 A1 Nov. 19, 2015

Related U.S. Application Data

(60) Provisional application No. 61/994,679, filed on May 16, 2014.

(51) Int. Cl.
*G01M 13/02* (2006.01)
*F16H 57/01* (2012.01)
*G01H 1/00* (2006.01)

(52) U.S. Cl.
CPC .......... *G01M 13/028* (2013.01); *F16H 57/01* (2013.01); *G01H 1/003* (2013.01); *F16H 2057/012* (2013.01)

(58) Field of Classification Search
CPC ......... G01M 13/08; F16H 57/01; G01H 1/003

(Continued)

(56) References Cited

U.S. PATENT DOCUMENTS

| | | | |
|---|---|---|---|
| 5,566,092 A | 10/1996 | Wang et al. | 702/185 |
| 5,895,857 A | 4/1999 | Robinson et al. | 73/660 |

(Continued)

FOREIGN PATENT DOCUMENTS

| | | |
|---|---|---|
| EP | 2366310 A1 | 9/2011 |
| GB | 1369050 | 10/1974 |

OTHER PUBLICATIONS

Delgado, Irebert R., et al. "Continued Evaluation of Gear Condition Indicator Performance on Rotorcraft Fleet." Prepared for the AHS International Technical Specialists' Meeting on Airworthiness, Condition Based Maintenance (CBM), and Health and Usage Monitoring (HUMS), Hunstville, Alabama, Feb. 11-13, 2013. Published by the National Aeronautics and Space Administration, Jun. 2013. Retrieved from http://ntrs.nasa.gov/archive/nasa/casi.ntrs.nasa.gov/20130014835.pdf on Apr. 22, 2016.

(Continued)

*Primary Examiner* — Lisa Caputo
*Assistant Examiner* — Tarun Sinha
(74) *Attorney, Agent, or Firm* — James Richards

(57) ABSTRACT

A method and system for diagnosing gear condition by comparing data collected from each member of a set of coupled gears, including mating gears. Data containing vibrations or other signals from the set of coupled gears are collected. Condition indicators are calculated from the vibration data. The values of these condition indicators are compared for each pair of coupled gears. A divergence of the condition indicators as indicated by the comparison may indicate the presence of a faulted or otherwise anomalous condition. Such indication may be provided to a user. In one variation, the vibration data are used to calculate a synchronous average for each gear and the condition indicators are based on the synchronous average.

26 Claims, 6 Drawing Sheets

(58) Field of Classification Search
USPC .......................................................... 73/593
See application file for complete search history.

(56) References Cited

U.S. PATENT DOCUMENTS

| | | | | |
|---|---|---|---|---|
| 6,651,012 | B1 | 11/2003 | Bechhoefer | 702/34 |
| 6,754,569 | B2 | 6/2004 | Bechhoefer | 701/29 |
| 6,847,917 | B2 | 1/2005 | Bechhoefer | 702/183 |
| 7,136,794 | B1 | 11/2006 | Bechhoefer | 703/7 |
| 7,945,397 | B2 | 5/2011 | Kar | 702/34 |
| 7,973,654 | B2 | 7/2011 | Ehrhart | 340/441 |
| 8,355,879 | B2 | 1/2013 | Bechhoefer | 702/35 |
| 8,380,447 | B2 | 2/2013 | Bechhoefer | 702/34 |
| 8,442,778 | B2 | 5/2013 | Bechhoefer | 702/34 |
| 2003/0028332 | A1 | 2/2003 | Dimaggio | 702/35 |
| 2004/0040397 | A1* | 3/2004 | Razzacki | F16H 57/00 74/335 |
| 2005/0284225 | A1* | 12/2005 | Luo | F16H 57/01 73/593 |
| 2011/0224917 | A1* | 9/2011 | Uluyol | G01M 13/045 702/34 |
| 2011/0230304 | A1* | 9/2011 | Morel | B64C 27/12 475/331 |

OTHER PUBLICATIONS

Sheng, S. "Wind Turbine Gearbox Condition Monitoring Round Robin Study—Vibration Analysis." Technical Report NREL/TP-5000-54530. Published Jul. 2012 by the National Renewable Energy Laboratory, Golden, Colorado. Retrieved from http://www.nrel.gov/docs/fy12osti/54530.pdf on Apr. 22, 2016.

Al-Atat, Hassan, et al. "A Systematic Methodology for Gearbox Health Assessment and Fault Classification." International Journal of Prognostics and Health Management, vol. 2, Issue 1 (2011): pp. 16-31. Published by the Prognostics and Health Management Society. Retrieved from https://www.phmsociety.org/sites/phmsociety.org/files/phm_submission/2009/ijPHM_09_004.pdf on Apr. 22, 2016.

McClintic, Katherine, et al. "Residual and Difference Feature Analysis with Transitional Gearbox Data." Proceedings of the 54th Meeting of the Society for Machinery Failure Prevention Technology, Virginia Beach, Virginia, May 1-4, 2000, pp. 635-645. Retrieved from http://php.scripts.psu.edu/staff/k/p/kpm128/pubs/ResDifAnalysisFinal.PDF on Apr. 22, 2016.

Zhu, Junda, et al. "Survey of Condition Indicators for Condition Monitoring Systems." Annual Conference of the Prognostics and Health Management Society 2014, Fort Worth, Texas, Sep. 29-Oct. 2, 2014. Retrieved from https://www.phmsociety.org/sites/phmsociety.org/files/phm_submission/2014/phmc_14_065.pdf on Apr. 22, 2016.

Hood, Adrian A. "Fault Detection on a Full-Scale OH-58 A/C Helicopter Transmission." Ph.D. dissertation, University of Maryland, College Park, 2010. Retrieved from http://drum.lib.umd.edu/bitstream/1903/11251/1/Hood_umd_0117E_11820.pdf on May 28, 2015.

Bechhoefer, Eric, & Michael Kingsley. "A Review of Time Synchronous Average Algorithms." Annual Conference of the Prognostics and Health Management Society 2009, San Diego, California, Sep. 27-Oct. 1, 2009. Retrieved from http://ftp.phmsociety.org/sites/phmsociety.org/files/phm_submission/2009/phmc_09_5.pdf on Apr. 22, 2016.

Lebold, Mitchell, et al. "Review of Vibration Analysis Methods for Gearbox Diagnostics and Prognostics." Proceedings of the 54th Meeting of the Society for Machinery Failure Prevention Technology, Virginia Beach, Virginia, May 1-4, 2000, pp. 623-634. Retrieved from http://citeseerx.ist.psu.edu/viewdoc/download?doi=10.1.1.462.9240&rep=rep1&type=pdf on Apr. 22, 2016.

US Joint Helicopter Safety Implementation Team, HFDM Working Group, "Health and Usage Monitoring Systems Toolkit", International Helicopter Safety Team, 2013, pp. 15-19.

US Army Research, Development, and Engineering Command. Aeronautical Design Standard Handbook Condition Based Maintenance System for US Army Aircraft, Mar. 7, 2013, pp. 100-107.

Laszlo Boros, RABA, Gyor, Hungary and Glenn H. BateBruel & Kjaer "Application Note, Early Detection of Gear Faults Using Vibration Analysis in a Manufacturer's Test Department" Web document downloaded May 1, 2015.

Marianne Mosher, Anna H. Pryor, and David G. Lewicki, NASA/TM-2003-212269 "Detailed Vibration Analysis of Pinion Gear with Time-Frequency Methods" National Aeronautics and Space Administration Ames Research Center Moffett Field, California, Jun. 2003.

PCT/US2015/031277, PCT international search report and written opinion of the international searching authority, ISA/US, Aug. 17, 2015.

RMCI, Response filed with Demand in application PCT/US2015/031277, response filed Mar. 15, 2016.

PCT/US2015/031277, PCT International Preliminary Report on Patentabiligy, IPEA/US, Sep. 1, 2016.

\* cited by examiner

DIAGNOSIS OF GEAR CONDITION BY COMPARING DATA FROM COUPLED GEARS

RELATED APPLICATIONS

This application claims the benefit under 35 USC 119(e) of provisional application Ser. No. 61/994,679, titled: "DIAGNOSIS OF GEAR FAULTS BY COMPARING DATA FROM MATING GEARS", filed May 16, 2014 by Potts et al.

All of the above listed US patent and patent applications are hereby incorporated herein by reference in their entirety.

BACKGROUND

Technical Field

The present invention pertains generally to the field of diagnostics for rotating machinery, and in particular, the diagnosis of gear conditions.

Background

Gears are critical components in many important mechanical systems such as helicopters, power plants, and various industrial systems. The failure of a gear in one of these systems can lead to great financial losses as well as the loss of life. One way to mitigate the risk of such failures is to detect faults while there is still time to perform maintenance. As a result, many industries have adopted the use of health and usage monitoring systems (HUMS) and similar devices that are designed to collect data related to the condition of the system and provide the HUMS user with an alert when a fault is detected.

One of the most successful methods for detecting gear faults is through the collection of vibration data produced by the gears as they mesh with each other. Particularly for gears, the most effective diagnostics are based on synchronous averages (related to time-synchronous averages or synchronous-time averages). Synchronous averaging is a technique that uses information about the angular position of a shaft (usually from a tachometer) to resample and average the raw time-domain vibration data; this accentuates vibrations that are at a harmonic of the shaft speed (i.e., the synchronous signals) and minimizes other vibrations (i.e., the asynchronous noise). A variety of algorithms are applied to the synchronous average to produce condition indicators (CIs) for the gears on the shaft of interest. These CIs are generally scalar-valued data that correspond to the physical condition of the gears.

One of the great challenges to vibration-based gear diagnostics is that many CIs are sensitive to changes in operating conditions as well as changes in the physical condition of the gears. Their values are often dependent on torque, rotational speed, operating conditions that cannot easily be measured, and random noise.

A variety of techniques have been used to deal with the variability in gear CI values. One solution is limiting the operating regimes in which data is collected, but that has drawbacks. One such disadvantage is that meaningful data cannot be collected continuously during operations, reducing the amount and frequency of data collection and introducing unmonitored gaps. If the regimes are defined too broadly, there is too much variability; if the regimes are defined too narrowly, it is difficult to acquire enough data. Most importantly, the operating regime is not the only source of variability in the CI values, so there can still be high levels of noise.

Another set of approaches to dealing with noisy CI values is smoothing. This smoothing can use a simple moving average or median filter or a more complex model-based method such as a Kalman filter. In either case, smoothing comes with practical challenges and can make the system slower to respond to and alert the user to the presence of a fault. Effective use of this approach requires access to maintenance information so that the monitoring system can appropriately reset after any maintenance changes to the monitored system.

Due to the lack of a satisfactory way to compensate for CI sensitivity to operating condition and random variation, it can be difficult to separate the true indication of a fault from the noise. In fact many common CIs are ineffective in real-world applications because the noise level is too high, making the CI performance too poor to be useful in determining gear condition.

BRIEF DESCRIPTION

The present disclosure generally relates to a method and system for diagnosing gear condition by comparing data collected from each member of a set of coupled gears, including mating gears. Data containing vibrations or other signals from the set of coupled gears are collected. Condition indicators are calculated from the vibration data. The values of these condition indicators are compared for each pair of coupled gears. A divergence of the condition indicators as indicated by the comparison may indicate the presence of a faulted or otherwise anomalous condition. Such indication may be provided to a user. In one variation, the vibration data are used to calculate a synchronous average for each gear and the condition indicators are based on the synchronous average.

In various alternatives, the comparison may comprise a difference, a fractional or percent difference, a ratio, a product, or other difference calculation.

The vibration data may be processed to generate a synchronous average for each respective gear based on the respective rotation rate for each respective gear.

The system may include one or more rotation sensors for sensing rotation related to each gear. The rotation sensor may be a single rotation sensor coupled to the gears and related to each gear rotation rate by a known gear ratio. Alternatively each gear shaft may be directly measured with a dedicated rotation sensor. Alternatively, the rotation sensor may be synthesized from vibration data, such as gear tooth meshing vibration data or other vibration data, detected from the vibration sensor. The rotation sensor should be accurate enough to support the generation of a synchronous average that is synchronous with the rotation rate of each respective gear.

In a further alternative, the rotation rate may be known or may be fixed and need not be measured concurrently with the vibration data. A predetermined value may be used for the rotation rate.

In further alternatives, the CI may be based on an energy of the vibration data or the synchronous average. The energy may be a residual energy after removal of gear tooth meshing frequency components. The energy may be a root mean square value.

In further alternative, the CI may be based on the $4^{th}$ moment about the mean of the difference signal normalized by the square of the variance of the difference signal, after the gear tooth meshing frequencies and first-order sidebands have been removed from the signal.

In a further alternative, the CI may be based on a residual kurtosis of the vibration or synchronous average after removing the gear tooth meshing frequency components.

In a further alternative, the CI may be based on sideband modulation of the gear tooth meshing frequency modulated at the gear rotation frequency.

In a further variation, the vibration data may be collected and recorded with the remaining evaluation computed at a later time at a different site.

The comparison condition indicator may be computed at a periodic maintenance interval.

The comparison CI may be computed based on existing primary CIs already installed and available, thus minimizing cost and installation time for the improved comparison CI.

Further variations include a non-transitory computer readable storage medium storing computer software that determines a condition of a device containing a gear set, said gear set comprising a first gear rotationally coupled to a second gear optionally in mating contact, said storage medium containing one or more of:

executable code that receives vibration data from said vibration sensor vibrationally coupled to said gear set;

executable code that receives rotation data from a rotation sensor rotationally coupled to said gear set;

executable code that records said rotation data set and said vibration data set in a memory;

executable code that determines a rotation of said first gear based on said rotation data set and a rotation of said second gear based on said rotation data set;

executable code that determines a first condition indicator based on said vibration data set processed synchronously with said rotation of said first gear;

executable code that determines a second condition indicator based on said vibration data set processed synchronously with said rotation of said second gear;

executable code that determines a comparison condition indicator based on comparing said first condition indicator and said second condition indicator.

Further variations include associated methods for detecting a condition in a device containing a gear train, said gear train having a first gear rotationally coupled to a second gear optionally in mating contact, said methods comprising one or more of:

(a) an evaluation system sensing rotation of said gear train;

(b) said evaluation system sensing vibration of said device, said vibration comprising vibration coupled from said gear train;

(c) said evaluation system receiving or determining a first condition indicator for said first gear based on processing said vibration of said device relative to a rotation parameter of said first gear, said rotation parameter of said first gear determined from said sensing of said rotation of said gear train;

(d) said evaluation system receiving or determining a second condition indicator for said second gear based on processing said vibration of said device relative to a rotation parameter of said second gear, said rotation parameter of said second gear determined from said sensing of said rotation of said gear train; said rotation parameter of said first gear being not equal to said rotation parameter of said second gear;

(e) said evaluation system comparing said first condition indicator with said second condition indicator to generate a comparison condition indicator.

Further variations include methods for detecting a condition in a device containing a gear train, said gear train having a first gear rotationally coupled to a second gear, said method comprising one or more of:

an evaluation system receiving or determining a first condition indicator indicating a condition of said first gear;

said evaluation system receiving or determining a second condition indicator indicating a condition of said second gear;

said evaluation system comparing said first condition indicator with said second condition indicator to generate a comparison condition indicator.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

An improved condition indicator may be derived from a comparison of two related condition indicators. The two indicators may be selected to be two CIs that have similar responses to one or more environmental factors and dissimilar responses to a particular fault mode. For example, two CIs for two coupled gears may have similar responses to torque or RPM variations, but different responses to localized faults on one of the gears. For example, a fatigue crack in one gear may show rotation vibration at the rotation rate of the affected gear, with less affect at the rotation rate of the non-affected gear. The CIs for each gear may respond similarly to a common factor, for example, an increase in torque, i.e., the two CIs may both show an increased noise response to an increase in torque. Thus, a comparison, for example, difference between the two CIs may reduce the common factor and allow the placement of a more sensitive threshold with respect to the fault pattern.

The two gears may mate with other gears or be part of a larger system of gears. The analysis may be extended to encompass more than two mating gears. Data from both gears extraneous to the two in comparison and other sources of noise are removed via the method disclosed.

Figure 1:
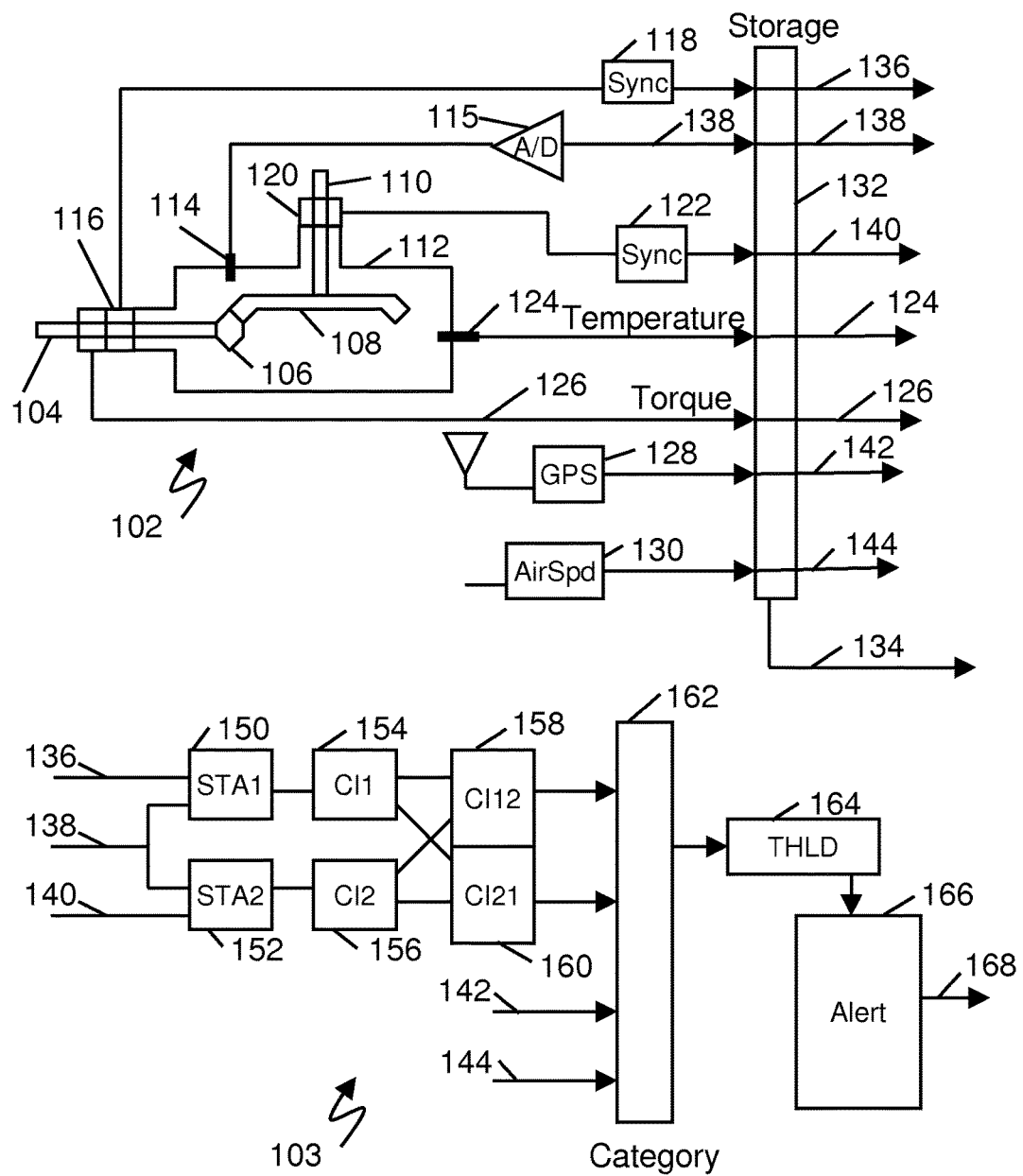
FIG. 1 is a block diagram of an exemplary system for comparing two condition indicators to derive a more sensitive condition indicator.

FIG. 1 is a block diagram of an exemplary system for comparing two condition indicators to derive a more sensitive condition indicator. Referring to FIG. 1, an exemplary transmission 102 having two mating gears 106, 108 is shown coupled to sensors 114, 116, 120, 124, 126, 128, and 130 and a processor 103 to derive an improved condition indicator 158, 160 and display 168 an indication based on the improved condition indicator. The transmission 102 comprises an input shaft 104 coupled to an input gear 106. The input gear 106 is meshed with an output gear 108 operatively connected to an output shaft 110. The gears 106, 108 are housed in a transmission housing 112. The transmission housing 112 has one or more vibration sensors 114 to sense vibration coupled from the gears 106, 108 to the housing 112. The number and position of the vibration sensors 114 may be determined by experiment and/or modeling. In one variation, a single vibration sensor 114 may sense vibrations from both gears 106, 108. Alternatively, a separate sensor may be placed for best response from each gear (not shown). Alternatively, vibration sensors may be placed for observation of different failure modes and generation of separate condition indicators directed to each different failure mode (not shown). Further, multiple condition indicators for different failure modes may be based on a single vibration sensor 114.

The vibration sensor 114 is shown with an A/D converter 115, and the input shaft rotation sensor 118 and output shaft rotation sensor 122 (alternatively referred to as synchronization sensors, or tachometers) are shown with respective driver and digital converter units 118 and 122 as needed. The other sensors, for example temperature 124 and torque 128, may also include driver and A/D as necessary (not shown).

The input and output shafts 104, 110 are each fitted with respective rotation sensors 116, 120 to assist in relating vibration data 138 to the shaft rotation angle of each gear shaft 104, 110. The rotation sensors 116, 120 may provide a pulse at a reference shaft angle for each revolution. Additional shaft angles may be estimated by interpolating pulse to pulse time. Alternatively the rotation sensors 116, 120 may be encoders providing angle resolution of the shaft. In a further alternative, the rotation sensor may be a tachometer providing speed information without angle resolution with shaft position, if needed, being determined by other methods. In further variations, the rotation sensor may be a single rotation sensor on an auxiliary shaft in the drive train (not shown), related to the two desired gears by known speed ratios of the drive train. Rotation and synchronization information may be derived for each of the gears 106, 108 from the single rotation sensor based on the known gear ratio. Also there may be an intervening clutch or other device that can periodically change the phase of the rotation sensor; however, during a given CI calculation, the clutch remains engaged and the rotation information remains valid. A particular phase relationship of the rotation information to the gear may not be needed for one or more of the CIs being derived as long as the phase remains constant during each evaluation.

In a further variation, a separate rotation sensor may be absent. Instead, the rotation sensor information may be synthesized from the vibration information. The gear tooth mesh vibration frequency itself may be detected to generate rotation information. The gear tooth mesh vibration frequency may be divided by known gear tooth counts to derive rotation information for the desired gears.

Alternatively, if the rotation rate of the drive train is otherwise known and sufficiently constant, a synchronous average may be calculated based on the known rotation rate without requiring a rotation sensor operating concurrently with the vibration sensor. The rotation rate may be premeasured or otherwise predetermined. The rotation rate may result from controlled motors or AC synchronous motors with fixed rates.

In addition to vibration and shaft position sensors, other sensors may also be provided to refine the estimates and/or provide operational categories for interpretation and thresholding of the results. A torque sensor 126 and temperature sensor 124 are shown. In addition, a GPS receiver 128 may provide speed and altitude information. An airspeed sensor 130 may provide speed information. Other sensors may be used for non-aircraft applications, for example, industrial machinery.

The various sensors are provided to a memory storage block 132 for real time or later processing. The storage data 134 may be downloaded for processing by maintenance facilities.

The signals shown include the vibration signal 138, the input shaft rotation signal 136, output shaft rotation signal 140, and temperature 124, torque 126, GPS 142, and airspeed signals 144.

The vibration signal 138 and the two gear rotation signals 136, 140 (alternatively referred to as tachometer signals or tachometer pulses) are processed in the processor section 103 to determine a synchronous time average 150 152 of the vibration signal 138 for each of the gear rotation rates 136, 140. The synchronous time average is derived by summing the vibration signal over multiple revolutions of the gear.

The objective of the synchronous time average, also referred to as STA, or synchronous average or time synchronous average, is to sum vibration signals into a data record synchronously with the rotation of the desired shaft and gear. Upon receiving a tachometer pulse representing a shaft zero degree position, the subsequent vibration data is summed sequentially starting with the first memory location in the data record. When the next tachometer pulse is received, the incoming data is again summed sequentially starting with the first memory location, added to past data, and again with subsequent tachometer pulses. Thus, each memory location corresponds to a different incremental shaft angle and stores a sum of the sensor values for that shaft angle. For a given time synchronous average, 10, 100, 1000 or other number of revolutions may be summed with more revolutions typically producing better noise reduction.

The effect is that gear related vibrations sum coherently while outside noises sum more weakly. Further, gear related vibration patterns for separate gears may be distinguished by different rotation rates resulting in different synchronous time lengths. For example in a two gear set with a first gear 106 and a second gear 108, a bad gear tooth on the first gear 106 will produce vibration at the first gear 106 coherent tooth location on the synchronous time average data record based on the first rotation rate sensor 116; whereas if the gear set has a hunting tooth count ratio, the first gear 106 bad tooth vibrations will be distributed across the tooth locations on the second gear 108 time average record based on the second rotation sensor 120. Thus, the process enhances response to the first gear 106, while suppressing response to the second gear 108 as well as other system vibrations.

In one variation, only a single gear rotation sensor is used and the second gear rotation signal is derived from the first gear rotation signal by using the known gear ratio.

Where the rotation rate is constant, a time based synchronous average may adequately correspond to the shaft angle. For slight rotation rate variation, interpolation may be used to improve the match between timing and shaft angle, but where the speed varies widely, it may be desirable to use a shaft encoder to more closely match the data to the shaft angle to produce a synchronous average better matched to the shaft angle.

The synchronous time average data record is then processed to produce one or more primary condition indicators 154, 156. For example, the primary condition indicator 154,

156 may be a residual kurtosis indicator responsive to the peakedness of the signal. A gear with a bad tooth should show a high peak at the bad tooth timing in the STA and thus show a response using the residual kurtosis indicator. Other indicators may also respond to peak signals, for example RMS indicators. Other mechanisms, such as the sideband based indicators may also detect the asymmetry of the STA data record. One may experiment with simulated faults to select the most effective indicator algorithm. One may also implement multiple algorithms running in parallel for improved fault detection or detection of multiple different fault types.

The primary condition indicator may also be sensitive to variations in operating conditions. For example the residual kurtosis indicator may show an increase in peakedness with an increase in torque under normal operating conditions.

As shown, the primary condition indicators 154, 156 from both gears 106, 108 are used to produce comparison condition indicators 158, 160. The comparison operation may include differences, ratios, or other comparison operations. For example, the two kurtosis results may be compared by differencing. Thus, when the torque increases, the noise induced by the torque should be much the same for both gears and the difference should remain near zero for normal operation—without fluctuation in response to torque variations. However, when one tooth begins a fatigue crack, the resulting noise should increase the primary CI of the affected gear and create a difference detectable in the comparison CI, even though the difference may be smaller than the variations in the primary CI caused by torque.

Depending on the comparison method, the order of comparison may produce a different result. Thus both comparisons 158, 160 may be calculated as shown CI12 and CI21.

The comparison results may then be combined with sensor information that is indicative of flight mode or other operational category 162. For example engine idle, take-off and cruise may be indicated, or simply high or low torque. Depending on mode, one or another primary CI may be preferred, for example RMS, kurtosis, or other process. Or depending on mode, a different detection threshold may be called for.

Once category information is processed, the selected CI may be compared in block 164 with a threshold to provide a warning or alert 166 output 168 to a user.

System Partitioning

The exemplary system of FIG. 1 shows numerous function blocks. The blocks may be grouped or divided and grouped into physical units for additional benefits. In particular, the processing blocks 103 may be separated from the data acquisition blocks. In one variation, the entire system may be housed in an aircraft and the output may be configured to drive a status display to a user, e.g., an operator, a technician, a pilot or other user. In another variation, the sensor data 134 may be communicated by radio to a remote site for processing in real time during operation. In another variation, the basic sensor data 134 may be recorded during operation and later downloaded for processing at a different site. In further variations, part of the processing may be performed on board, and the results including CI values downloaded or communicated to the remote site for evaluation. For example the vibration and rotation data may be used to determine CI values 154, 156, 158, and 160 in flight. The CI values may then be communicated to the ground without the raw vibration data 138, thereby greatly reducing data bandwidth required for communication. Similarly, the CI values may be determined in real time and recorded, while discarding (not recording) the raw vibration data 138, thereby reducing the memory requirements for storing historical data.

Figure 2A:
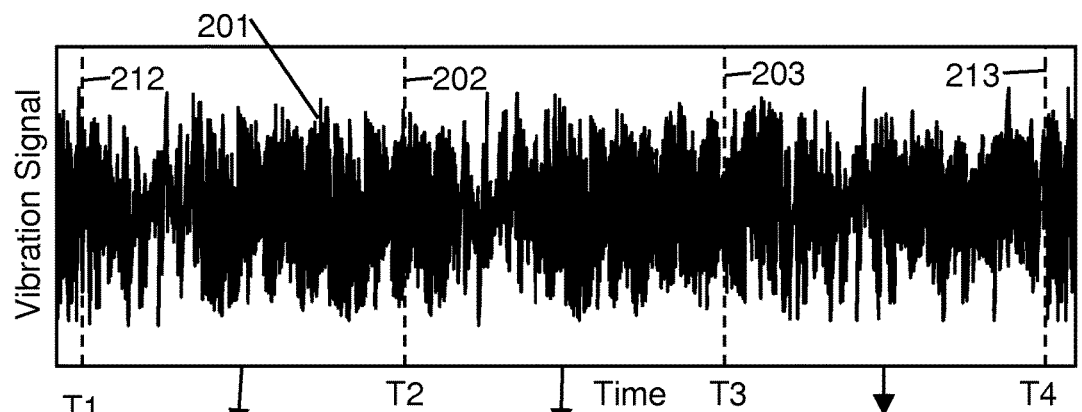
FIG. 2A-FIG. 2C illustrate an exemplary synchronous average process.
Figure 2B:
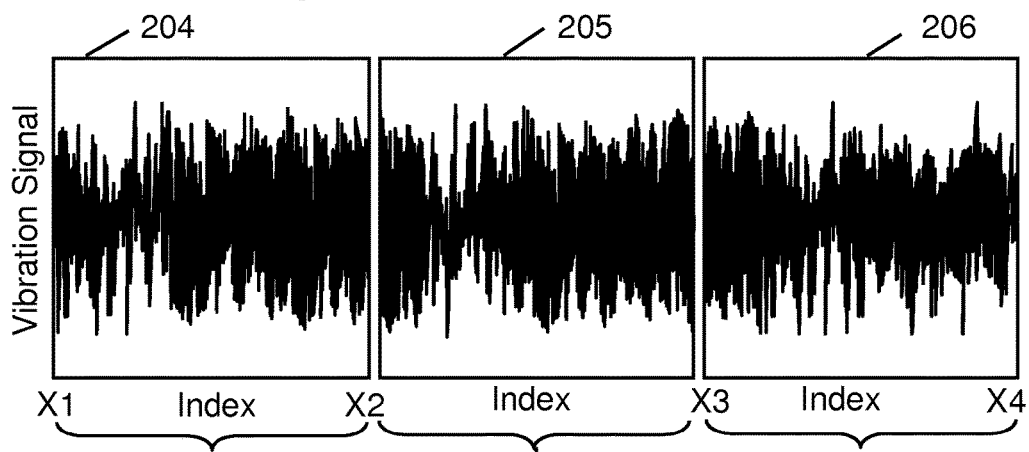
Figure 2C:
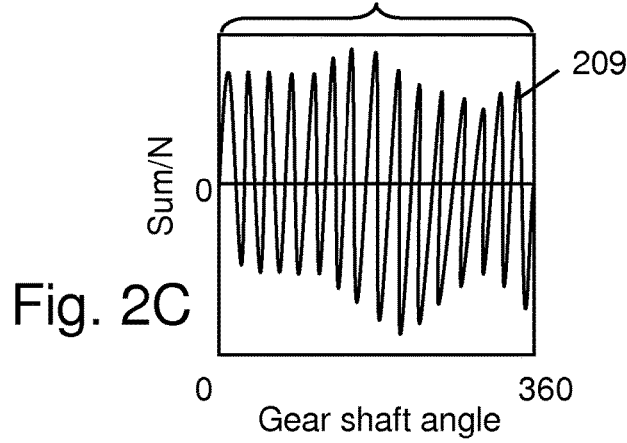

FIG. 2A-FIG. 2C illustrate an exemplary synchronous average process. A synchronous average may be calculated by operating on a time-domain signal 201 from a vibration sensor. A first step may be identifying points in time T1-T4, i.e., 212, 202, 203, 213 where the shaft of interest is in the same rotational position, as may be derived from a rotation sensor. FIG. 2A shows an exemplary vibration signal vs. time showing the reference shaft positions at times T1-T4. FIG. 2B shows the signal information from FIG. 2A loaded into memory with increasing memory location index, X1-X4 corresponding to T1-T4. Each block 204, 205, 206 may correspond to a single rotation of the shaft. FIG. 2C shows a third step producing a synchronous average by summing the blocks of FIG. 2B, each incremental location in sequence to form the summation and then divide by N, the number of blocks summed to arrive at the average dataset. Performing these steps with digitized data may also require one or more interpolation steps to best match timing and angle axes.

Comparison Condition Indicators

In one exemplary application involving two mating gears, a condition indicator value may be calculated for each gear in a mating pair and then mathematically comparing the two values to produce a comparison condition indicator. The mathematical comparison may comprise one or more of: evaluating a ratio, product, difference, or percent difference between the two condition indicators, or other comparison algorithms.

This method can be effective because much of the variation in a vibration signal that is not related to a gear fault typically has the same effect on the CI values for both gears. The raw accelerometer signal contains vibrations from the meshing gears of interest and vibrations from other sources. The vibrations from the meshing gears of interest includes periodic time-domain vibrations produced as each pair of teeth mesh together. The synchronous average process for each shaft minimizes the vibrations from other sources and lines up the gear tooth meshing vibrations for each tooth on the gear attached to the respective shaft. The gear tooth meshing vibrations are accentuated in both synchronous averages since the meshing is synchronous with both gears. The two synchronous averages are equally affected by changes in asynchronous background vibrations and changes in the magnitude of the gear tooth meshing vibrations as well as any effects of the vibration transmission path between the source of the vibrations and the accelerometer. Most of the useful information regarding a gear fault is contained in the way the gear vibrations change with respect to the rotational angle of the gear, so (particularly for a hunting tooth gear ratio, i.e., the two gear tooth counts have no common prime factor) this information will uniquely appear in the synchronous average corresponding to the faulted gear. Since the primary difference between the synchronous averages comes from angle-specific variations in the gear vibrations that correspond to gear faults, this is also the primary cause of differences in CI values calculated from them. As a result, this technique greatly improves the signal-to-noise ratio for gear condition diagnostics.

Figure 3:
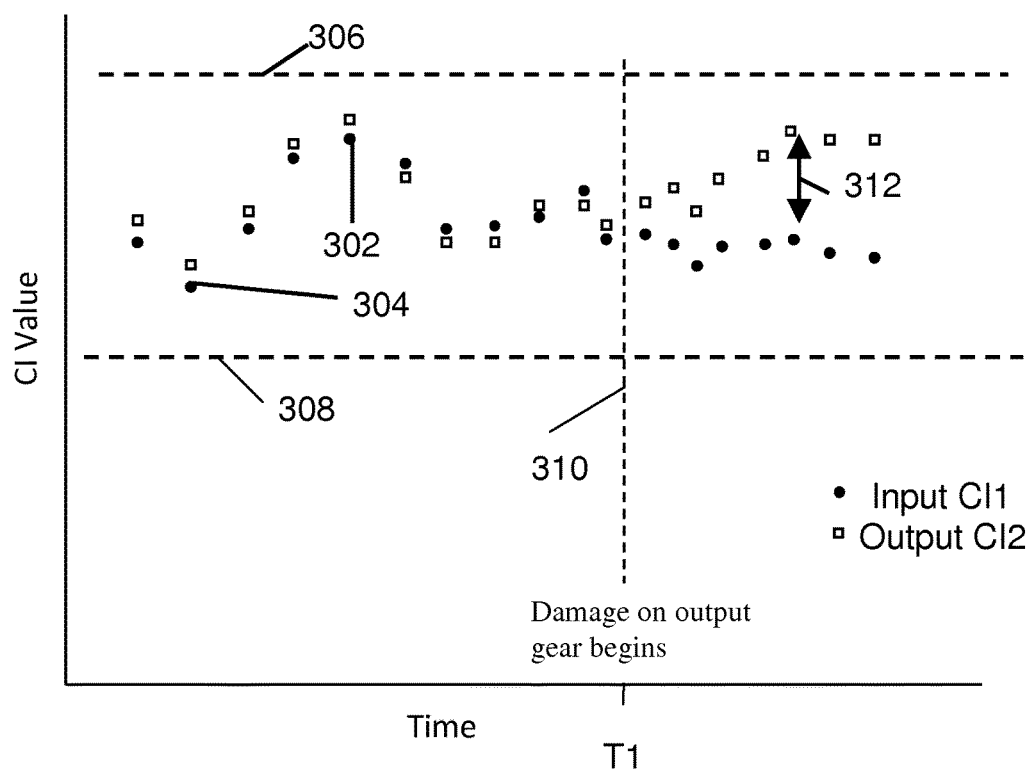
FIG. 3 is an example plot showing the typical behavior of gear CIs before and after a fault begins to develop.
Figure 4:
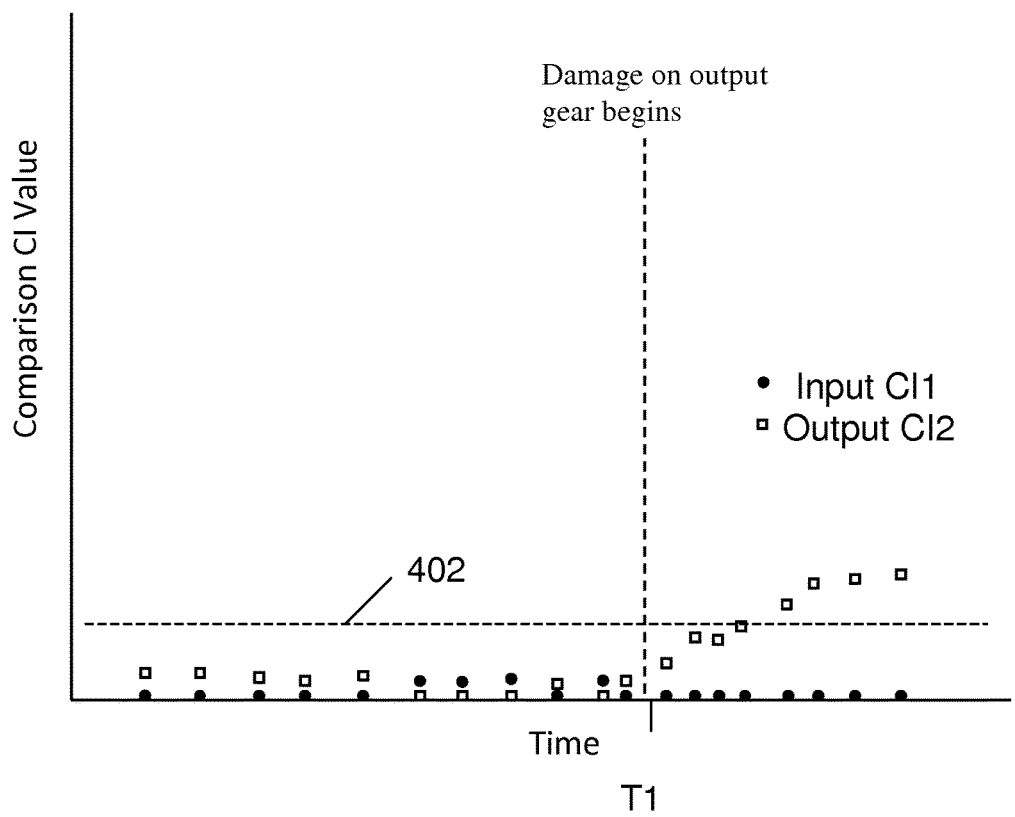
FIG. 4 depicts a comparison CI value based on the two CI values of FIG. 3.

Because the method dramatically reduces the noise, many CIs that are not by themselves useful indications of gear condition (FIG. 3) can be used as inputs to the disclosed method, resulting in reliable comparison CIs with excellent performance (FIG. 4).

FIG. 3 depicts an exemplary plot showing the typical behavior of gear CIs before and after a fault begins to develop. Referring to FIG. 3, a CI value is computed for an input gear coupled to an output gear yielding a corresponding CI1 and CI2 respectively. The two undamaged gears operate through varying conditions, for example torque, through a first interval, before T1 310. Point 302 may represent a high torque condition showing both indicators high and close in value. Point 304 may represent a low torque condition showing both indicators low and close together.

At time T1, a fatigue crack begins on the output gear. As the crack grows, the value of the output gear CI2 diverges from the value of the input gear CI1. The divergence 312 is clearly detectable soon after T1 even though both CI1 and CI2 remain within the range bounds 306, 308 of normal operation and cause no alarm individually.

FIG. 4 depicts a comparison CI value based on the two primary CI values of FIG. 3. Referring to FIG. 4, a comparison CI value is shown based on an absolute value of the difference between CI1 and CI2 of FIG. 3. As previously mentioned, alternative comparison algorithms may be used. A threshold 402 may be established for alerting a user of incipient failure and impending danger. The interpretation of each comparison CI value and the threshold 402 for alerting the user would be based on a complete potential failure analysis of the target gear pair along with expected incipient failure growth rate and corresponding comparison CI value growth rate.

In order to increase the benefit of this method, the comparison CI values for each of the mating gears may be calculated from data acquired at the same time or at times very close together. In one alternative, the comparison CI values may be calculated from the same data stream from a single sensor. Alternatively, comparison CI values may be from parallel identically clocked data streams from two sensors. Identical clocking may result in identical responses from external vibrations and other phenomena. Alternatively, the two CI values may be from delayed data. Preferably the values should be close enough in time to result from the same operating conditions, for example, the same torque, RPM, temperature, lubrication state or other parameters.

Exemplary Processes

One exemplary embodiment comprises using software that compares corresponding CI values from mating gears and outputs values that quantify the relationship between the corresponding CI values. Two possible means of implementing this embodiment in software are as a standalone software program (FIG. 5) and as a subroutine that is part of a larger HUMS software system (FIG. 6). In either of these cases, the software would contain three functionalities: the ability to acquire and format the CI values, a mechanism by which to calculate the mathematical comparison, and the ability to output the results.

The acquisition and output interfaces may be adapted to an application of the invention. When the method is implemented as a subroutine in a larger software system, the interfaces could be basic function or method calls or internal application programming interfaces (APIs). When the embodiment of the invented method is a standalone software program, these interfaces could be external APIs, standard file format interfaces, or custom file format interfaces based on the sources and targets of the data.

The calculation mechanism may utilize available mathematics operations to calculate the output of a mathematical comparison function, $f(x,y)$, based on the input CI values. Possible comparison functions include subtraction [$s(x,y)=x-y$], ratio [$r(x,y)=x/y$], and fractional or percent difference [$p(x,y)=(x-y)/y$]. The selection of a particular comparison function may be determined by modeling or simulation of faults using a range of comparison functions to determine the best performing comparison function.

A comparison value may be calculated for both orderings of the inputs. If the input CI has the value CI1 for the input gear and the value CI2 for the output gear, the calculation mechanism may calculate both $f(CI1, CI2)$ and $f(CI2, CI1)$.

The calculation mechanism can include an optional capability to limit the range of the output of the comparison function so that it cannot be less than its nominal value when the two inputs are equal, $f(1,1)$. If this option is used, the calculation mechanism will output a comparison condition indicator value that is the greater of the value of the comparison function and its nominal value when the two inputs are equal. This highlights the gear with the higher CI value while the comparison condition indicator for the other gear stays at its nominal value. If this option is used, the value of the comparison condition indicator for the input gear is CCI12=max($f(CI1, CI2),f(1,1)$) and the value of the comparison condition indicator for the output gear is CCI21=max($f(CI2, CI1),f(1,1)$). If the option is not used, they are CCI12=$f(CI1, CI2)$ and CCI21=$f(CI2, CI1)$.

The selection of a comparison function and whether or not to limit the range of the comparison condition indicators can be provided to the software through a configuration file.

Figure 5:
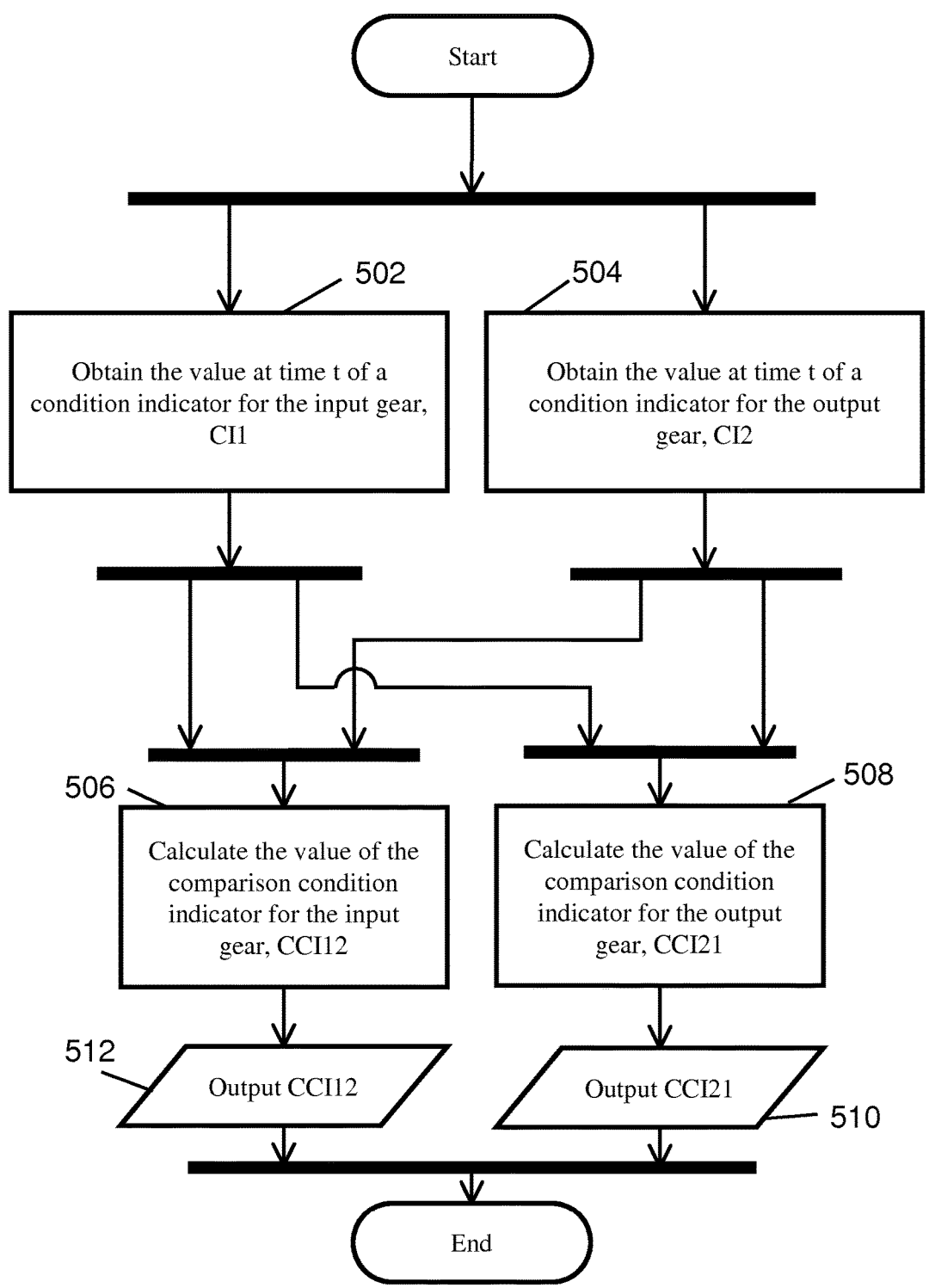
FIG. 5 shows a flowchart of an exemplary process using existing CI values.
Figure 6:
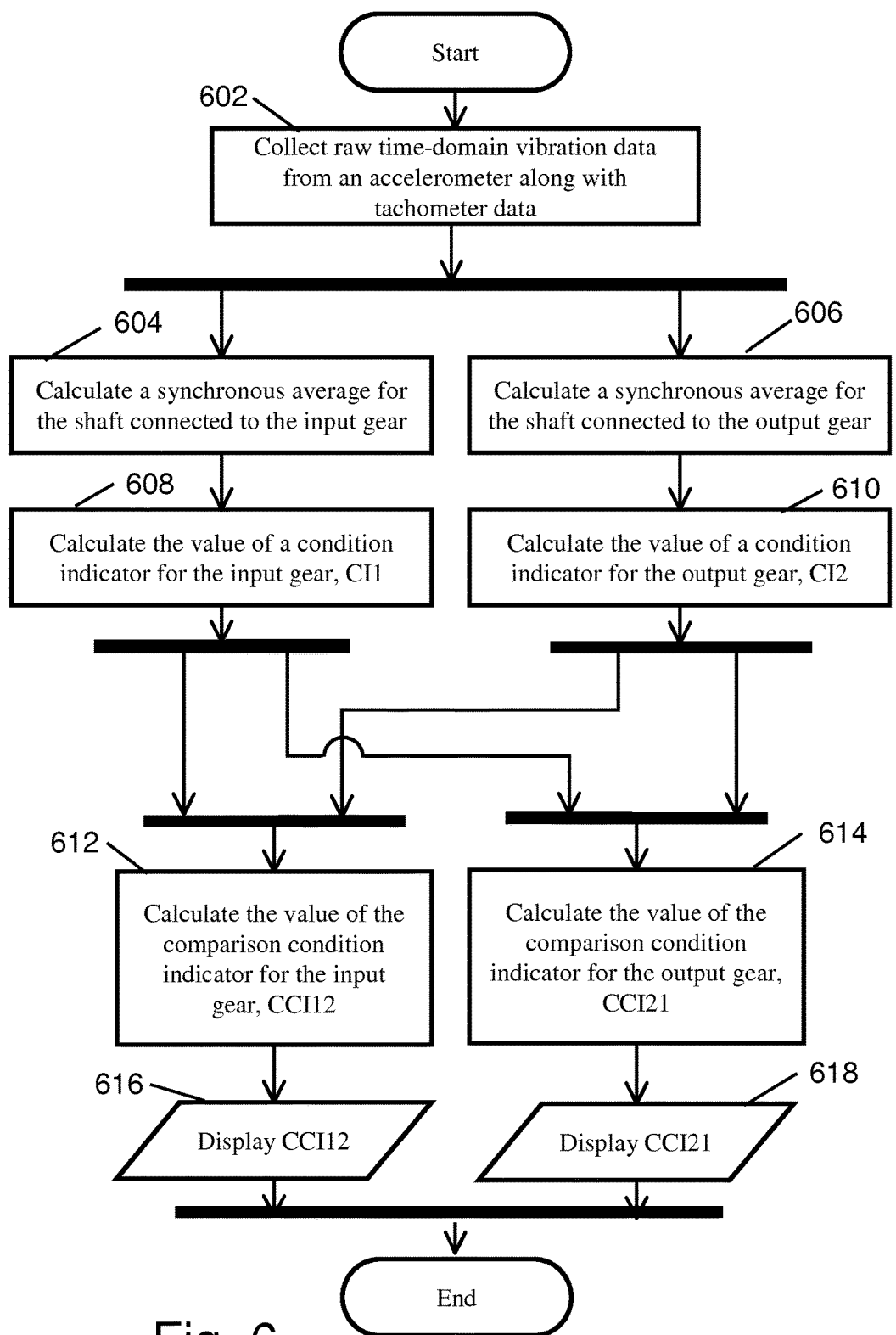
FIG. 6 shows a flowchart of an exemplary process implemented as a part of a HUMS process.

FIG. 5 shows a flowchart of an exemplary variation using existing CI values.

Referring to FIG. 5, steps 502 and 504 obtain the values of the condition indicators CI1 and CI2 for the input and output gears respectively. Steps 506 and 508 compute the value of the comparison indicator for the input and output gears, CCI12 and CCI21. Steps 512 and 510 may store and output the respective values for CCI12 and CCI21.

FIG. 6 shows a flowchart of an exemplary variation implemented as a part of a HUMS process. Referring to FIG. 6, in step 602, time domain vibration data is obtained from a vibration sensor along with angular position data. Steps 604 and 606 create a synchronous average for the input and output gears. Steps 608 and 610 calculate the respective condition indicators for the input and output gears. Steps 612 and 614 compute the value of the comparison indicator for the input and output gears, CCI12 and CCI21. Steps 616 and 618 may store and output the respective values for CCI12 and CCI21.

Exemplary Condition Indicators

The following is a brief description of several condition indicators that may be used with the present disclosure. The techniques disclosed herein are not limited to the following CIs. Further, the following CIs may be modified and/or adapted to a given application.

Residual Kurtosis—A CI based on the peakedness of a residual signal after removing expected signal components. For example, gear tooth meshing frequency components may be removed from a synchronous average signal to yield a residual signal. A fourth moment (for example, a Pearson moment) may then be computed on the residual signal. The result may be scaled. Alternate functions and refinements may be used.

Root Mean Square (RMS)—A CI that may calculated by summing the square of each element in the data set and dividing by the number of data points. The square root of the result yields the RMS value.

Residual RMS—A CI based on the root mean square (RMS) value of the residual signal after removing the gear tooth meshing frequency components.

Residual Peak-to-Peak—A CI based on the peak-to-peak value of the residual signal after removing the gear tooth meshing frequency components.

Sideband Index—A CI based on the average value of the frequency components on either side of the gear tooth meshing frequency component in a synchronous average.

Sideband Level Factor—A CI based on the average value of the frequency components on either side of the gear tooth meshing frequency component in a signal, divided by the standard deviation of the signal.

FMO—A CI based on the peak-to-peak value of the synchronous average signal, divided by the sum of the magnitudes of the gear tooth meshing frequency components and their harmonics.

FM4—A CI based on the peakedness of an intermediate signal after removing expected signal components from the prior signal. For example, gear tooth meshing frequency components and their sidebands may be removed from a synchronous average signal to yield an intermediate signal. A fourth moment (for example, a Pearson moment) may then be computed on the intermediate signal. The result may be scaled. Alternate functions and refinements may be used.

DA1—A CI based on the RMS of the zero-mean signal where the zero-mean signal is the signal minus the arithmetic mean of the signal.

Energy Ratio—A CI based on the ratio between the energy in an intermediate signal after removing expected signal components from the prior signal and the energy contained within the prior signal. For example, gear tooth meshing frequency components and their sidebands may be removed from a signal to yield an intermediate signal.

Use of a Comparison Condition Indicator

A comparison CI may be especially useful for maintenance operations of transportation vehicles, especially where critical safety issues are involved as with aircraft, in particular helicopters. If a helicopter transmission fails, the helicopter is likely to come down. Thus, it is critical to determine proper maintenance procedures at proper intervals to insure safety. Thus, a primary user of CI information would be the maintenance personnel. Various strategies may be employed. In one strategy, data gathering equipment may be installed at periodic maintenance intervals, e.g. monthly, annually, and test flights performed to determine current CIs. In another strategy, the equipment may be permanently installed, and data downloaded at periodic maintenance intervals, which may be daily or after each flight as well as after 100 hours, annually, or other maintenance intervals. In a third strategy, on-board alarms may be generated if critical faults are detected. On-board alarms, however, should be weighed against possible false alarms and the consequences of pilot action, such as unneeded forced landings.

Applications

The present disclosure is well adapted to assessing the condition of gears in the transmissions of helicopters where gear failure can result in tragic loss of life. The application, however, may extend generally to aircraft, automotive, rail, and marine applications as well as industrial machinery or other products using gears. A more sensitive condition indicator can more positively intercept impending failures and accurately indicate life left in gear systems, reducing unnecessary system maintenance and replacement.

Industrial applications may focus on different degradation patterns as being unacceptable yet far short of total failure. Slight gear wear or spalling may result in drive jitter or backlash that results in mis-registration, inaccurate, or poor quality parts or material being produced from the machinery. This disclosure provides herein methods and systems for detecting and isolating the particular gear causing a problem and/or detecting early a condition leading to a problem, allowing product quality to be maintained without degradation.

CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Non-transitory computer-readable storage media comprise all computer-readable storage media except for a transitory, propagating signal or other non-patentable subject matter. The computer readable storage media may include a computer hard drive, ROM, RAM flash memory, portable storage media including CD, DVD, flash drive and or other drive. The drive may include USB interface.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for detecting a condition in a device containing a gear train, said gear train having a first gear rotationally coupled to a second gear said second gear having a different number of teeth from said first gear, said method comprising:
   (a) an evaluation system receiving gear train rotation information relating to rotation of said gear train;
   (b) said evaluation system receiving vibration information relating to vibration of said device, said vibration of said device comprising vibration coupled from said gear train;
   (c) said evaluation system determining a first condition indicator for said first gear based on processing said vibration information relative to a rotation parameter of said first gear, said rotation parameter of said first gear determined from said gear train rotation information;
   (d) said evaluation system determining a second condition indicator for said second gear based on processing said vibration information relative to a rotation parameter of said second gear, said rotation parameter of said second gear determined from said gear train rotation information; said rotation parameter of said first gear being not equal to said rotation parameter of said second gear;
   (e) said evaluation system comparing said first condition indicator with said second condition indicator; and
   (f) said evaluation system generating a comparison condition indicator based on said comparing said first condition indicator with said second condition indicator.

2. The method in accordance with claim 1, wherein said first gear and said second gear are in mating contact.

3. The method in accordance with claim 1, wherein said gear train rotation information is from a rotation sensor coupled to said gear train.

4. The method in accordance with claim 1, wherein said gear train rotation information comprises predetermined rotation data.

5. The method in accordance with claim 1, wherein said comparison step comprises: said evaluation system comparing said first condition indicator with said second condition indicator by determining a difference between said first condition indicator and said second condition indicator.

6. The method in accordance with claim 1, further including a step:
comparing said comparison condition indicator with a predetermined threshold to provide a warning or alert output.

7. The method in accordance with claim 1, wherein said comparison step comprises: said evaluation system comparing said first condition indicator with said second condition indicator by determining a ratio between said first condition indicator and said second condition indicator.

8. The method in accordance with claim 1, wherein said first condition indicator is further based on a synchronous average of said vibration of said device, said synchronous average being synchronous with a rotation angle of said first gear.

9. The method in accordance with claim 8, wherein said first condition indicator is based on an energy value of said synchronous average.

10. The method in accordance with claim 9, wherein said energy value is based on a root mean square evaluation of said synchronous average.

11. The method in accordance with claim 1, wherein said rotation parameter of said first gear comprises a synchronous timing of said first gear synchronous with a rotation angle of said first gear.

12. A system for determining a condition of a device containing a gear set, said gear set comprising a first gear rotationally coupled to a second gear, said second gear having a different number of teeth from said first gear, said system comprising:
at least one vibration sensor for vibrational coupling to said device for sensing vibration in said device coupled from said gear set;
at least one rotation information source for determining rotation information relating to rotation of said gear set;
a processor coupled to said vibration sensor for receiving vibration data from said vibration sensor;
said processor configured to determine rotation of said gear set based on said rotation information;
said processor configured for determining a rotation angle of said first gear based on said rotation information and configured for determining a rotation angle of said second gear based on said rotation information;
said processor configured for determining a first condition indicator based on said vibration data processed synchronously with said rotation angle of said first gear;
said processor configured for determining a second condition indicator based on said vibration data processed synchronously with said rotation angle of said second gear;
said processor configured for determining a comparison condition indicator based on comparing said first condition indicator with said second condition indicator.

13. The system in accordance with claim 12, wherein said first gear and said second gear are in mating contact.

14. The system in accordance with claim 12, wherein said rotation information is from a rotation sensor coupled to said gear train.

15. The system in accordance with claim 12, wherein said rotation information comprises predetermined rotation data.

16. The system in accordance with claim 12, wherein said comparing said first condition indicator and said second condition indicator comprises determining a difference between said first condition indicator and said second condition indicator.

17. The system in accordance with claim 12, further including:
said processor configured for comparing said comparison condition indicator with a predetermined threshold to provide a warning or alert output.

18. The system in accordance with claim 12, wherein said comparing said first condition indicator and said second condition indicator comprises determining a ratio between said first condition indicator and said second condition indicator.

19. The system in accordance with claim 12, wherein said first condition indicator comprises determining an energy in a component of said vibration signal.

20. The system in accordance with claim 12, wherein said synchronous processing of said vibration data set comprises determining a time synchronous average of said vibration data set.

21. A non-transitory computer readable storage medium storing computer software that determines a condition of a device containing a gear set, said gear set comprising a first gear and a second gear in mating contact said second gear having a different number of teeth from said first gear, said storage medium containing:
executable code that receives or determines a first condition indicator relating to a condition of said first gear;
executable code that receives or determines a second condition indicator relating to a condition of said second gear;
executable code that determines a comparison condition indicator based on comparing said first condition indicator with said second condition indicator.

22. The non-transitory computer readable storage medium as recited in claim 21, further containing:
executable code that receives vibration data from a vibration sensor vibrationally coupled to said gear set;
executable code that receives a rotation data set from a rotation data source providing rotation data related to rotation of said gear set;
executable code that determines a rotation angle of said first gear based on said rotation data set and a rotation angle of said second gear based on said rotation data set;
executable code that determines said first condition indicator based on said vibration data set processed synchronously with said rotation angle of said first gear; and
executable code that determines said second condition indicator based on said vibration data set processed synchronously with said rotation angle of said second gear.

23. A method for detecting a condition in a device containing a gear train, said gear train having a first gear rotationally coupled to a second gear said second gear having a different number of teeth from said first gear, said method comprising:
an evaluation system receiving a first condition indicator indicating a condition of said first gear;

said evaluation system receiving a second condition indicator indicating a condition of said second gear;

said evaluation system comparing said first condition indicator with said second condition indicator;

said evaluation system generating a comparison condition indicator based on said comparing said first condition indicator with said second condition indicator.

24. The method as recited in claim 23, wherein said first condition indicator is sensitive to vibration synchronous with a rotation angle of said first gear while suppressing vibration synchronous with a rotation angle of said second gear.

25. The method as recited in claim 23, wherein said first condition indicator is derived based on vibration information relating to vibration of said first gear coupled to a vibration sensor, further based on said vibration information processed synchronously relative to a rotation angle of said first gear determined from rotation information relating to the rotation of said first gear.

26. The method as recited in claim 25, wherein said rotation information is based on a rotation sensor coupled to said gear train.

* * * * *